United States Patent
Katsumata et al.

[11] 3,739,184
[45] June 12, 1973

[54] METHOD AND APPARATUS FOR INSPECTING A BOTTLE

[75] Inventors: Takuma Katsumata, Inazawa; Hideo Uchiyama, Nishi-ku, Nagoya; Yoshiharu Marita, Shows-ku, Nagoya, all of Japan

[73] Assignee: Mitsubishi Jukogyo Kabushiki Kaisha, Chujoda-ku, Tokyo, Japan

[22] Filed: June 11, 1971

[21] Appl. No.: 152,081

Related U.S. Application Data

[63] Continuation-in-part of Ser. No. 826,472, May 21, 1969, abandoned.

[52] U.S. Cl............. 250/223 B, 250/227, 356/240
[51] Int. Cl............................................ H01j 39/12
[58] Field of Search.............. 250/219 DF, 223 B, 250/227; 350/96 B; 356/198, 240; 209/111.7

[56] References Cited
UNITED STATES PATENTS

| | | | |
|---|---|---|---|
| 3,292,785 | 12/1966 | Calhoun | 356/240 |
| 3,348,049 | 10/1967 | Stacey | 250/223 B |
| 3,349,906 | 10/1967 | Calhoun | 250/223 B |
| 3,245,533 | 4/1966 | Rottmann | 356/240 |
| 3,639,067 | 2/1972 | Stephans | 250/223 B |
| 3,150,266 | 9/1964 | Mathias | 250/223 B |
| 2,735,017 | 2/1956 | Beard | 250/223 B |
| 3,415,370 | 12/1968 | Husome | 250/223 B |
| 3,515,883 | 6/1970 | Akamatsu | 250/219 DF |
| 3,479,514 | 11/1969 | Kidwell | 356/240 |
| 3,505,526 | 4/1970 | Sendt | 250/227 |

*Primary Examiner*—James W. Lawrence
*Assistant Examiner*—D. C. Nelms
*Attorney*—John J. McGlew and Alfred E. Page

[57] ABSTRACT

To detect foreign matter on the surface of a bottle, an instrument incorporating an optical fiber bundle is inserted into the bottle with incident light directed to the inlet end of the fiber bundle. Within the instrument, the optical fiber bundle is divided at its outlet end to provide separate optical signals which are converted into electrical signals for indicating the presence of foreign matter.

12 Claims, 14 Drawing Figures

Patented June 12, 1973
3,739,184
4 Sheets-Sheet 2
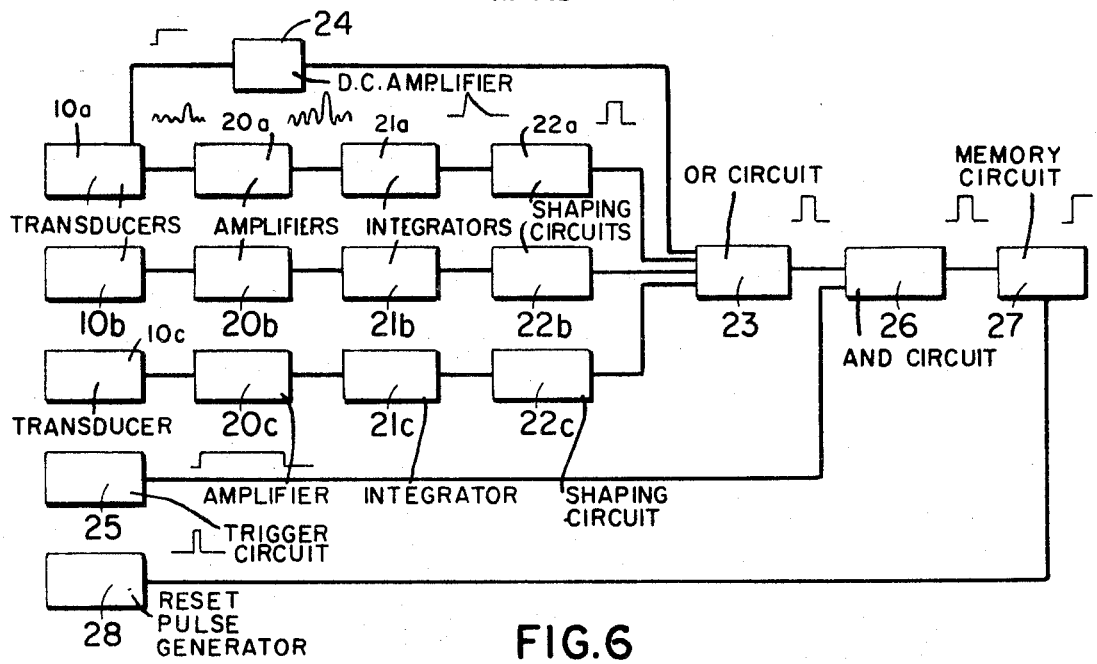
FIG.6
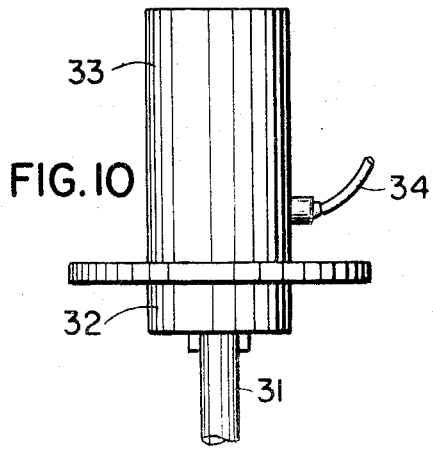
FIG.10
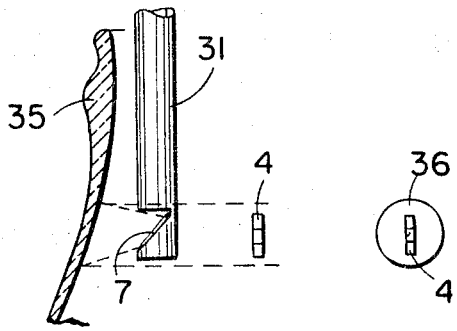 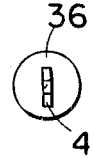
FIG.11    FIG.12
INVENTORS:
TAKUMA KATSUMATA
HIDEO UCHIYAMA
YOSHIHARU NARITA
by *McGlew & Toren*
ATTORNEYS.

3,739,184

METHOD AND APPARATUS FOR INSPECTING A BOTTLE

CROSS REFERENCE TO RELATED APPLICATION

This application is a continuation-in-part of U.S. application Ser. No. 826,472, filed May 21, 1969, for "METHOD AND APPARATUS FOR INSPECTING A BOTTLE," now abandoned.

SUMMARY OF THE INVENTION

The present invention is directed to a method of and apparatus for automatically detecting foreign matter deposited on the inner or outer surfaces of a bottle, such as a bottle used for liquors, soft drinks, milk, and the like, and, more particularly, it is concerned with the division of light signals for conversion into individual electrical signals for determining the presence of the foreign matter.

In the past, there has been proposed a method for inspecting bottles which employed an inside inspectoscope within the bottle and a diffused light directed into the bottle from the outside. However, in order to turn a reticule for detecting foreign matter, the method required means for raising or lowering the bottle as it is rotated while the inspectoscope is fixed in position. Furthermore, since the inside inspectoscope guided light along a considerable distance by means of a lens, the F-member of the lens (the ratio of focal length to an incident aperture) was limited to a large value so that the quantity of light obtainable was small. Moreover, since the inspecting field of the inside inspectoscope was large, there was a limit to the size of the foreign matter which could be detected. Further, as the electric circuitry for detecting the foreign matter employed a frequency modulation system, in order to enhance the signal to noise ratio, there was the disadvantage that not only was the adjustment of the circuitry difficult, but also the loss in the quantity of light in the inspectoscope was large.

Therefore, a primary object of the present invention is to provide a method of and apparatus for inspecting a bottle in which the disadvantages of the prior art are overcome and an effective means for dividing light signals into individual electrical signals is afforded for determining the presence of foreign matter or substances on the surface of the bottle.

Another object of the invention is to employ an optical fiber bundle which is divisible into separate channels at its outlet end for subsequent conversion of the light signals into electrical signals.

Therefore, in accordance with the present invention, as the bottle is rotated, means for detecting foreign substances can be raised or lowered and thereby afford a continuous automatic detecting arrangement. In the method of inspecting the bottle, incident light, which may be diffused light directed inwardly through the bottle side wall, as in the mentioned prior art method, is supplied to the inlet end of an inside inspectoscope which employs an optical fiber bundle. At its outlet end the optical fiber bundle is divided into separate channels to afford individual optical or light signals, and these individual signals are then converted into electrical signals. By amplifying and processing the individual electrical signals by means of electrical circuitry containing an integrator, which circuitry can be incorporated into the inspectoscope, the presence of various sizes of foreign matter can be established. Moreover, since an optical fiber bundle is used in the inspectoscope, a large value of the F-number for the lens can be used to supply a large quantity of light. Furthermore, since the optical fiber bundle is divided at its outlet end, it subdivides the area of the inspecting field and, in each of the subdivided areas, the change in quantity of light due to foreign matter can be determined as a higher ratio of change.

Another advantage obtained by subdividing the inspecting field is that smaller areas or spots of foreign substances can be detected. Because of the division of the inspecting field, the signal to noise ratio is large, and the signal processing circuit can be simplified. Since the optical fiber bundle and the electric circuitry are combined within a single instrument which can be raised and lowered within the bottle, external noise is prevented from mixing into the detecting signals, and, further, by employing an integrator circuit in the output from a photoelectric transducer element, an improved signal to noise ratio is achieved in this novel method of inspecting a bottle.

For an understanding of the principles of the invention, reference is made to the following description of a typical embodiment thereof as illustrated in the accompanying drawings.

BRIEF DESCRIPTION OF THE DRAWINGS

In the drawings:

FIG. 6 is a block diagram of the electrical circuitry incorporated into the inspecting instrument illustrated in FIGS. 1 through 5;

FIG. 10 is a partial side view of the instrument illustrated above with the electrical circuitry incorporated within its housing;

FIG. 11 is a partial longitudinal view, of the inspecting instrument positioned within a bottle;

FIG. 12 is a view of the inspecting field of the instrument illustrated in FIG. 11 indicating the manner in which the inspecting field is divided by means of an optical fiber bundle;

DETAILED DESCRIPTION OF THE PREFERRED EMBODIMENT

Figure 1:
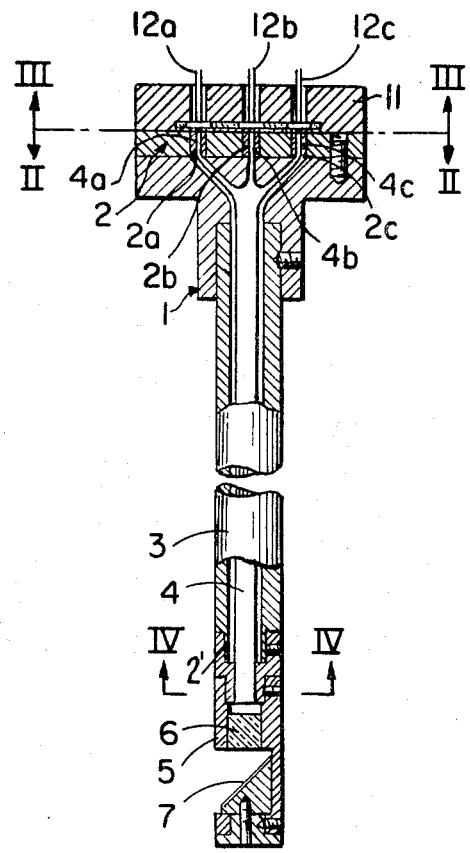
FIG. 1 is a longitudinal view, partly in section, of a bottle inspecting instrument embodying the present invention.
Figure 2:
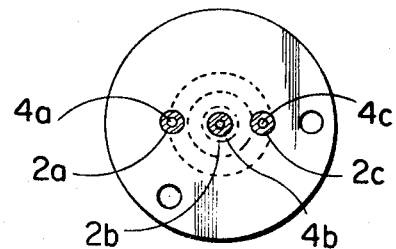
FIG. 2 is a transverse view taken along the line II—II of FIG. 1 in the direction as indicated by the arrows.
Figure 3:
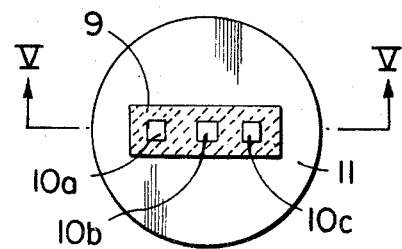
FIG. 3 is a transverse view, partly in section, taken along the line III—III in FIG. 1 in the direction as indicated by the arrows.
Figure 5:
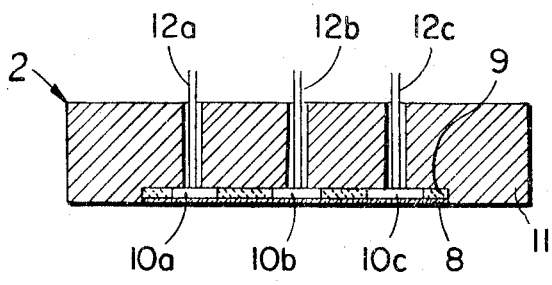
FIG. 5 is a cross sectional view taken along line V—V in FIG. 3.
Figure 4:
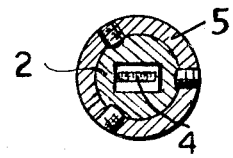
FIG. 4 is a transverse view taken along line IV—IV in FIG. 1.

In FIGS. 1 to 5, a bottle inspecting instrument or inside inspectoscope is formed of a housing comprised of adapter sections 1 and 2 located at the upper end of a longitudinally extending tubular member 3. The adapter member 1 fits over the upper end of the tubular member 3 and is secured to it by means of screws.

Extending axially through the tubular member 3 is an optical fiber bundle 4. Mounted on the lower end of the tubular member 3 is a sleeve 5 which extends below the lower or inlet end of the optical fiber bundle and holds an objective lens 6. Below the objective lens the sleeve 5 is open along one side and supports a reflecting mirror 7 positioned at an angle of 45° with a normal to the lens 6. The mirror 7 is adapted to produce an image of the side surface of a bottle being inspected.

Within the body of the tubular member 3 the member 2' serves as a holder for the optical fiber bundle 4. At the upper end of the tubular member the optical fiber bundle enters into the adapter section 1 and is divided into three separate spaced sections 4a, 4b, 4c, with the ends of these sections being secured within terminals 2a, 2b and 2c, respectively, within an adapter section 2 mounted on the upper surface of the adapter section 1.

A transparent glass plate 8 is mounted on the upper surface of the adapter section 2 and extends across the outlet ends of the three sections 4a, 4b, 4c, of the optical fiber bundle. Positioned on the upper face of the transparent glass plate and aligned above the outlet ends of the optical fiber bundle are three photoelectric transducer elements 10a, 10b and 10c. The transducer elements are insulated from one another by means of an insulating body 9 are positioned within a recess in the lower face of an upper adapter section 11 which is mounted on top of the adapter section 2. Lead wires 12a, 12b and 12c are connected to the transducer elements 10a, 10b, 10c, respectively, and extend upwardly from the adapter section 11.

Figure 13:
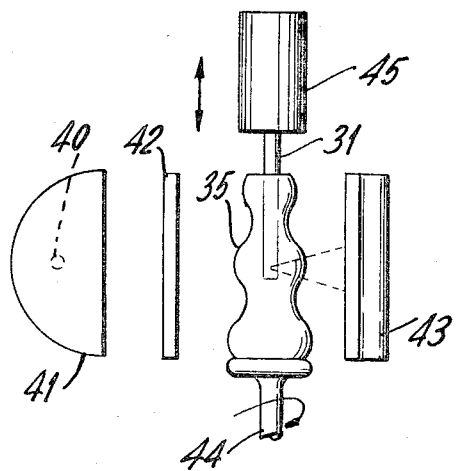
FIG. 13 is a somewhat schematic elevation view illustrating the means for directing light through the bottle.
Figure 14:
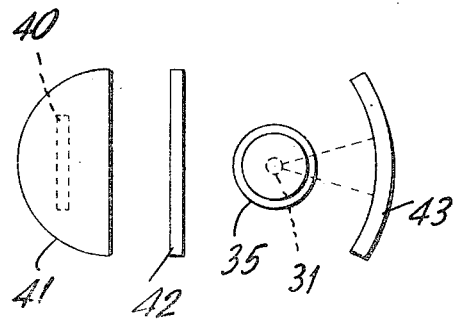
FIG. 14 is a somewhat schematic plan view corresponding to FIG. 13.

Referring, for the moment, to FIGS. 13 and 14, a light source, comprising a lamp 40 with an associated reflector 41, directs light through an opaque glass plate 42 through the side wall of a bottle 35, and an opaque glass reflector plate 43 is positioned on the opposite side of bottle 35. The bottle to be inspected is supported on a rotatable table 44, and the inside inspectoscope is positioned within the bottle and is movable vertically by a suitable means, such as 45, as indicated by the double-ended arrow.

The block diagram shown in FIG. 6 illustrates the electrical circuitry for processing the electric signals from the photoelectric transducer elements 10a, 10b and 10c. These signals are furnished to a logical OR circuit 23 after passing serially through the respective amplifiers 20a, 20b and 20c, integrators 21a, 21b and 21c and shaping circuits 22a, 22b and 22c. In addition, a part of the output from the transducer element 10a, is supplied to the logical OR circuit 23 through a branch circuit containing a DC amplifier 24. The output from the logical OR circuit 23 is applied to a logical AND circuit 26 and the output of a trigger circuit 25, for defining the inspecting positions on the bottle, is also supplied to the logical AND circuit 26. From AND circuit 26, the output is supplied to a memory circuit 27 which also is connected to a reset pulse generator 28 for resetting the memory circuit.

Figure 7:
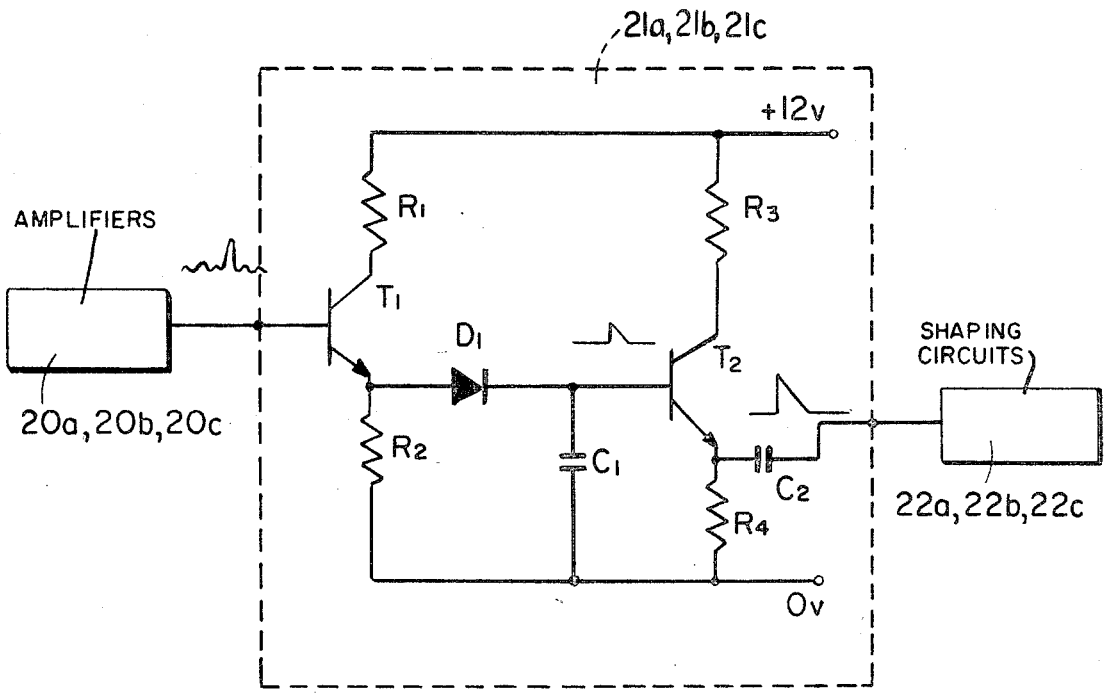
FIG. 7 is a detailed circuit diagram of an integrator circuit employed in the circuitry set forth in FIG. 6.

Each of the integrators 21a, 21b and 21c, indicated in FIG. 6, has the internal circuitry illustrated in FIG. 7. The collectors of two silicon transistors $T_1$ and $T_2$ are connected through respective resistors $R_1$ and $R_3$ to the positive terminal of a source of potential, and the respective emitters of the two transistors are connected, through respective resistors $R_2$ and $R_4$, to the zero volt terminal of the source of potential. Thus, transistors $T_1$ and $T_2$ operate as emitter-followers, so that resistors $R_1$ and $R_2$ are sufficiently small with respect to resistors $R_3$ and $R_4$. A silicon diode $D_1$ is connected between the emitter of transistor $T_1$ and the base of transistor $T_2$, and serves to prevent current from flowing through resistor $R_2$ when a capacitor $C_1$ has been charged. A second capacitor $C_2$ is connected to the emitter of transistor $T_2$ and also to a respective shaping circuit 22a, 22b and 22c.

Each of the integrators 21a, 21b and 21c, indicated in FIG. 6, is constructed as shown in FIG. 7. In the integrators, the collectors of two silicon transistors $T_1$ and $T_2$ are connected to resistors $R_1$, $R_2$ and $R_3$ and $R_4$, respectively, so that the silicon transistors $T_1$ and $T_2$ operate as emitter-followers. Therefore, the resistors $R_1$, $R_2$ are sufficiently small with respect to the resistors $R_3$, $R_4$. A silicon diode $D_1$ is connected between the emitter of the silicon transistor $T_1$ and the base of the silicon transistor $T_2$, and diode $D_1$ serves to prevent a current from flowing through the resistor $R_2$ when a capacitor $C_1$ connected to it has been charged. A second capacitor $C_2$ is connected to the emitter of the silicon transistor $T_2$.

In FIG. 10, the instrument incorporating the inside inspectoscope and the electrical circuitry is indicated. The inside inspectoscope 31 has the adapter sections at its upper end, as indicated at 32, and 33 indicates the housing for the electric circuit. At the side of the housing, a cable 34 is shown for connection to a source of potential. In FIG. 11, the inspectoscope 31 is shown positioned within a bottle 35 and is arranged to inspect the side surfaces of the bottle with the inspecting field 36, indicated in FIG. 12, being reflected by means of the mirror 7 upwardly to the lower or inlet end of the optical fiber bundle.

In operation, the side surface of the bottle being inspected is imaged by the reflecting mirror 7 which is arranged at an angle of 45° with respect to a normal to an objective lens 6. Since the objective lens 6 focuses the image on the bottom or inlet end of the optical fiber bundle, the area of the side surface of the bottle within the inspecting field is defined by the inlet end of the fiber bundle. The image is divided into three sections by the division of the optical fiber bundle and is led, without optical interference between the individual sections, to the outlet ends 4a, 4b, 4c of the bundle. In other words, any change in the quantity of light supplied to the inlet ends of the optical fiber bundle by the mirror appears as a difference in the quantity of light at the upper or outlet ends 4a, 4b, 4c. Accordingly, any change in the quantity of light within the inspecting field will appear at the outlet ends of the optical fiber bundle.

The varying quantities of light which appear at each of the outlet ends 4a, 4b and 4c of the optical fiber bundle are transmitted through the glass 8 to the oppositely disposed photoelectric transducer elements 10a, 10b and 10c. Accordingly, the light signals transmitted by the optical fiber bundle to the outlet ends are converted by the transducer elements into electrical signals which are then processed by the electrical circuitry shown in FIG. 6. Specifically, the signals received from the three sections of the optical fiber bundle are supplied to the OR circuit 23 through the amplifier circuits 20a, 20b and 20c, the integrator circuits 21a, 21b and 21c and the wave form shaping circuits 22a, 22b and 22c, respectively, and the output from the OR circuit 23 is gated in the AND circuit 26 together with a signal from the trigger circuit 25 and then delivered into the memory circuit 27 for storage.

In this arrangement, the signals from the trigger circuit 25 serve to define the inspecting positions on the bottle 35, and they are generated from the commencement to the termination of the inspection operation. At the instant a signal is transmitted to a reject circuit which is preliminarily connected to the memory circuit, the pulse generating circuit 28 is operated to provide a reset pulse for clearing the memory circuit 27.

The D.C. amplifier circuit 24 is arranged to operate when the photoelectric transducer element 10a is kept in a dark state regardless of the inspecting position on the bottle 35. In other words, this circuit operates when there is no change in quantity of the light sensed by the optical fiber bundle because the entire side surface of the bottle 35 is coated with foreign matter, such as cement.

In FIG. 7, assuming that a signal is fed to the base of transistor $T_1$ from amplifier circuit 20a and a current flows through its collector, this current flows through the resistor $R_2$ and the diode $D_1$. However, the ratio between the currents flowing through the diode $D_1$ and the resistor $R_2$, respectively, is low due to the fact that the resistance of the diode $D_1$ is sufficiently smaller than the resistance of the resistor $R_2$, and thus most of the collector current flows through the diode $D_1$ to charge the capacitor $C_1$. The electrical charge stored in the capacitor $C_1$ is discharged through the resistor $R_4$, but the discharge period is relatively long as the resistance of the resistor $R_4$ is high. Therefore, on the wave form the charge period is very short, while the discharge period is long. Then, the charged capacitor $C_1$ applies a voltage across the base of transistor $T_2$ and ground to operate transistor $T_2$. The current flowing through the resistor $R_4$ induces a voltage across the resistor $R_4$, and this voltage is supplied to a wave form shaping circuit 22a, in the next step of the electrical circuitry.

Figure 8:
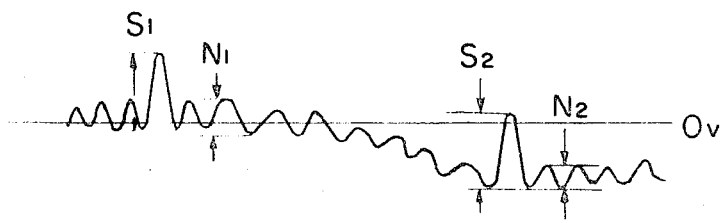
FIGS. 8 and 9 show input and output wave forms, respectively, of the circuit displayed in FIG. 7.

In FIG. 8, which shows the input wave forms of the integrator circuits 21a, 21b and 21c, the signal and noise appear in different ways from the bottle being inspected. It can be noted in FIG. 8, that the signal $S_1$ is larger than the noise $N_1$, and the signal $S_2$ is larger than the noise $N_2$. However, since the peak of the signal $S_2$ is lower than the peak of the noise $N_1$, when the wave form is sliced at a similar level the peak $S_1$ may be transmitted as a signal but the peak $S_2$ cannot be transmitted because it is lower than the peak of the noise $N_1$. Such a wave form is subjected to a linear variation in some cases, and in other cases it is subjected to a variation due to the shape of the bottle being inspected. In other words, even if the signal to noise ratio is sufficiently high at each point, it may be possible that the same foreign material can or cannot be detected depending on the position of the deposit over the entire surface of the bottle. Accordingly, it is necessary only to connect the integrator circuit 21a, 21b, 21c in order to eliminate this adverse effect.

Figure 9:
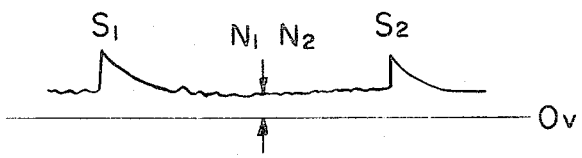

FIG. 9 illustrates the signal emanating from the output of the integrator circuits 21a, 21b and 21c. When the wave form of FIG. 8 has been integrated, the wave form for $N_1$ and $N_2$ is smoothed out to a large extent, and the wave form for $S_1$ and $S_2$ is also smoothed out, but the peaks for $S_1$ and $S_2$ remain, with small amplitudes. The amplitudes of these peaks are varied in accordance with the capacity of the capacitor $C_1$. As the wave form is an A.C. wave form, if the frequency of the noise signal and the frequency of the signals due to foreign matter are compared with each other, the frequency of the signal due to foreign matter is far higher than that of the noise signal, which latter comprises substantially a D.C. component. Thereby, the wave form shown in FIG. 9 is obtained at the output of capacitor $C_2$, and contains only the passed peaks, with the D.C. component being cut out by the capacitor $C_2$. Thereafter, only these peaks are amplified, and the S/N ratio is correspondingly improved.

In FIG. 10, the inspectoscope 31 and the electrical circuitry 33 are disposed within the same casing and can be raised and lowered as a unit. The flexibility of the cable 34 implements the vertical movement of the inspecting instrument.

In FIGS. 11 and 12, the relationship between the inspecting field 36 of the surface of the bottle and the inlet or lower end of the optical fiber bundle 4 is indicated. During the inspecting process, the bottle 35 is rotated while the inspectoscope 31 is raised or lowered to scan the side surface of the bottle in a spiral manner. Since the entire inspecting field is not reduced in the vertical direction, there is no need to increase the rotational speed of the bottle with respect to the speed of the vertical movement. In other words, not all of the inspecting field is seen by the optical fiber bundle, but instead the optical fiber bundle 4 conveys the change and quantity of light for the image focused on the slit-like surface. Therefore, the size of the inspecting field is determined by the size of the divided sections of the optical fiber bundle 4. When it is desired to detect even a small area of foreign matter, it can be accomplished by increasing the number of divided sections within a given inspecting field. For instance, if the area of the foreign matter is the same as that of one of the divided sections of the optical fiber bundle, the quantity of light through that one section can vary very widely. However, it is to be noted that the area of the foreign matter and the area of the end of the optical fiber bundle are related by a factor because the objective lens is positioned between them.

Since an optical fiber bundle is used in the barrel of the inspectoscope instead of a lens, the loss in quantity of light may be supressed by about 50 percent, and further, by dividing the optical fiber bundle, a large change in quantity of light may be obtained for various sizes of foreign matter appearing on the side surfaces of the bottle, and such foreign matter can be detected by means of a very simple electrical circuit.

Moreover, where the signal is caused by a foreign substance of considerable size, the image is focused on the end surfaces of the separate optical fiber bundle sections so that the respective transducer elements operate simultaneously and thereby result in an increase in a number of signals so that erroneous operation is avoided.

By employing the integrator circuit, the noise signal and the foreign matter signal may be distinguished because the signal emanating from the foreign matter is generated only once during each revolution of the bottle corresponding to only one occurrence of the bright and dark portions, respectively, whereas where a noise signal is involved, for instance, signals caused by characters printed on the bottle or by the uneven surface configuration of the bottle, they would occur at least several times during each revolution of the bottle and thus would be received successively so that they are charged in the capacitor $C_1$ shown in FIG. 7, and do not appear as an output. As a consequence, only the true signal of the foreign matter is transmitted by the instrument.

Concerning the mechanism of the inspecting apparatus it is very simple in structure with only the bottle being rotated while the inspectoscope is raised or lowered. Furthermore, since the inspectoscope and the electrical circuitry are integrated within the same casing, the apparatus has no lead wire and is hardly subjected to any external induction noises.

As described above, based on the present invention, a large value of the F-number of the lens is employed so that a large quantity of incident-light can be received by the inspectoscope. By dividing the optical fiber bundle at its outlet end it is possible to derive individual signals which are converted into electrical signals and by amplifying and processing the signal separately in an electrical circuit the bottle can be effectively inspected. Moreover, since the optical fiber bundle can be divided at its outlet ends to reduce the area of the individual inspecting fields, the change in quantity of light caused by foreign matter can be detected as a higher ratio change and even small quantities of foreign substances can be detected. Further, based on the use of the integrator circuit, the signal to noise ratio is improved, and a particularly advantageous method of inspecting a bottle is achieved.

While a specific embodiment of the invention has been shown and described in detail to illustrate the application of the principles of the invention, it will be understood that the invention may be embodied otherwise without departing from such principles.

What is claimed is:

1. Apparatus for inspecting a bottle for detecting foreign matter deposited on its surfaces comprising, in combination, a longitudinally extending housing arranged to be inserted into a bottle to be inspected, a longitudinally extending optical fiber bundle disposed within said housing and having a plurality of separate laterally spaced outlet ends, whereby said optical fiber bundle defines a corresponding plurality of optically separate light transmitting channels, and having a common inlet end for said channels, means reflecting light, transmitted inwardly through the side wall of the bottle to the inlet end of said optical fiber bundle, and respective means having incident thereupon the light from the separate outlet ends of said optical fiber bundle and operable to convert the light transmitted along said separate light transmitting channels into respective electrical signals for indicating changes in the quantities of light received by said separate light transmitting channels due to the presence of foreign matter on the surfaces of the bottle.

2. Apparatus, as set forth in claim 1, wherein said housing comprises a longitudinally extending tubular barrel, an adapter section mounted on one end of said tubular barrel and arranged to hold the outlet ends of said optical fiber bundle, and a sleeve fitted to the opposite end of said tubular barrel and extending outwardly beyond the inlet end of said optical fiber bundle.

3. Apparatus, as set forth in claim 2, including an objective lens mounted within said sleeve for focusing light on the inlet end of said optical fiber bundle.

4. Apparatus, as set forth in claim 3, wherein said means for reflecting incident light comprises a reflecting mirror mounted below and at an angle to the normal to said objective lens, and said sleeve having an opening therein for admitting light to said reflecting mirror whereby the light is conveyed through said objective lens to the inlet end of said optical fiber bundle.

5. Apparatus, as set forth in claim 2, wherein said adapter section comprises a plurality of laterally spaced terminals each arranged to hold a separate outlet end of said optical fiber bundle.

6. Apparatus, as set forth in claim 5, including a transparent glass plate supported on said adapter section and extending transversely across said separate outlet ends of said optical fiber bundle positioned within said terminals, and a plurality of photoelectric transducer elements mounted on the opposite side of said glass plate from said outlet ends, each of said transducer elements located in opposed relationship to one of said outlet ends of said optical fiber bundle disposed on the opposite side of said glass plate.

7. Apparatus, as set forth in claim 6, including a second adapter section mounted on the upper surface of said adapter section, and an insulating body disposed within said second adapter section, said transducer elements being disposed in spaced relationship within and spaced apart by said insulating body.

8. Apparatus, as set forth in claim 7, wherein an insulated lead wire is connected to each of said transducers and extends through said second adapter section and is insulated therefrom.

9. Apparatus, as set forth in claim 6, wherein each of said transducers is connected in serial arrangement to an amplifier, an integrator, and a wave form shaping circuit with each of said wave form shaping circuits being connected to a common logical OR circuit, a logical AND circuit connected to said logical OR circuit, and a memory circuit connected to said logical AND circuit.

10. An apparatus, as set forth in claim 9, including a trigger circuit, for defining inspecting positions on a bottle being inspected, connected to said logical AND circuit.

11. Apparatus, as set forth in claim 10, comprising a D.C. amplifier arranged to receive a part of the output from one of said photoelectric transducer elements, said D.C. amplifier being connected to said logical OR circuit for supplying the partial outlet from said transducer element thereto.

12. Apparatus, as set forth in claim 11, wherein a reset pulse generator is connected to said memory circuit for resetting the memory circuit.

* * * * *